United States Patent [19]
Weeks

[11] Patent Number: 6,082,523
[45] Date of Patent: Jul. 4, 2000

[54] PACKAGING MACHINE INFEED DEVICE

[75] Inventor: Matthew John Weeks, Wickwar, United Kingdom

[73] Assignee: Assidoman Holdings UK Limited, Essex, United Kingdom

[21] Appl. No.: 09/011,862

[22] PCT Filed: Sep. 2, 1996

[86] PCT No.: PCT/GB96/02149

§ 371 Date: Feb. 17, 1998

§ 102(e) Date: Feb. 17, 1998

[87] PCT Pub. No.: WO97/10165

PCT Pub. Date: Mar. 20, 1997

[30] Foreign Application Priority Data

Dec. 15, 1995 [GB] United Kingdom ............... 9525662

[51] Int. Cl.$^7$ .................................................. B65G 47/24
[52] U.S. Cl. ...................... 198/375; 198/379; 198/411; 198/432; 198/374
[58] Field of Search ................... 198/375, 418.1, 198/432, 379, 411, 414, 597, 374, 412, 468.3

[56] References Cited

U.S. PATENT DOCUMENTS

| | | | |
|---|---|---|---|
| 1,475,962 | 12/1923 | Olson | 198/597 |
| 2,741,384 | 4/1956 | Duval et al. | 198/432 |
| 3,037,334 | 6/1962 | Chidsey et al. | 198/411 |
| 3,194,382 | 7/1965 | Nigrelli et al. | 198/418.1 |
| 3,433,346 | 3/1969 | McCaskill | 198/379 |
| 3,462,912 | 8/1969 | Anderson | 198/374 |
| 3,587,876 | 6/1971 | Dahlem | 198/411 |
| 4,024,965 | 5/1977 | Marth et al. | 198/374 |
| 4,205,742 | 6/1980 | Thomas . | |
| 4,606,452 | 8/1986 | Lecrone . | |
| 4,610,347 | 9/1986 | Inoko | 198/432 |
| 5,000,027 | 3/1991 | Noda et al. | 198/375 |
| 5,320,478 | 6/1994 | Gonsowski et al. | 198/374 |
| 5,551,550 | 9/1996 | Marshall et al. | 198/432 |

FOREIGN PATENT DOCUMENTS

| | | |
|---|---|---|
| 2085397 | 12/1971 | France . |
| 2427818 | 1/1976 | Germany . |
| 1251912 | 11/1971 | United Kingdom . |
| 1255436 | 12/1971 | United Kingdom . |

*Primary Examiner*—Christopher P. Ellis
*Assistant Examiner*—Joe Dillon, Jr.
*Attorney, Agent, or Firm*—Dean W. Russell; Michael J. Turton; Kilpatrick Stockton LLP

[57] ABSTRACT

The device includes selectively operable article re-orienting means, allowing groups of articles to be packed together in a variety of orientations using a single standard packaging machine. An infeed conveyor carries the articles in a predetermined orientation using a single standard packaging machine. An infeed conveyor carries the articles in a predetermined orientation in a plurality of lanes. A group collator comprising a set of lane brakes and a movable backstop aligns a group of articles in one or more rows transverse to conveyor. A paddle transfers the group to the packaging machine. The re-orienting means turn a sub-group of articles making up the group to a specified orientation for such transfer, each article sub-group being turned about a respective axis normal to the plane of the infeed conveyor.

10 Claims, 10 Drawing Sheets

FIG.1
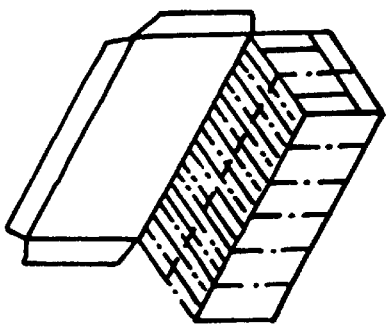
2 x 6 x 1
TOP FLAP TRAY
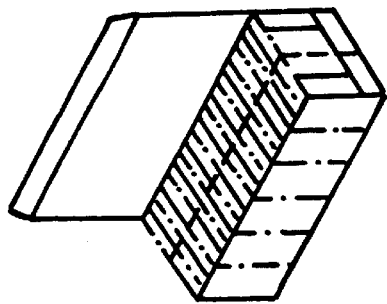
2 x 6 x 1
WRAPAROUND
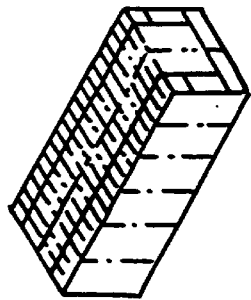
2 x 6 x 1
DISPLAY LEDGE TRAY
2 x 6 x 1
TRAY
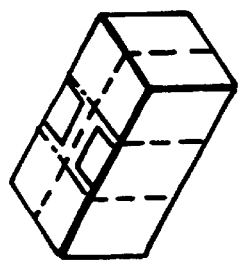
2 x 3 x 1
SLEEVE
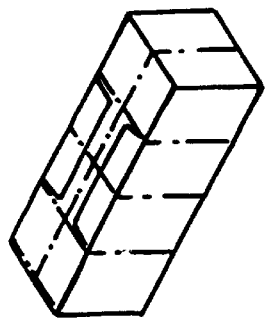
2 x 4 x 1
SLEEVE

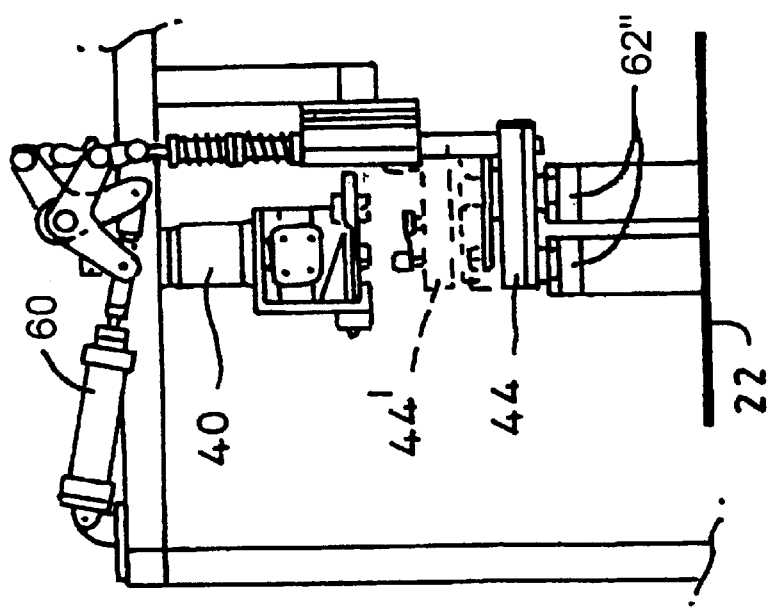
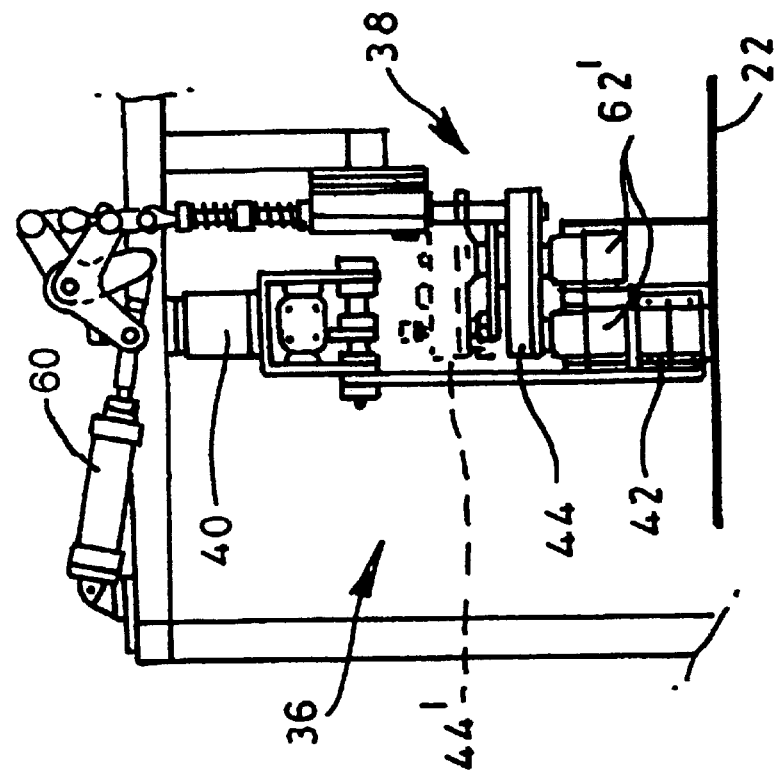

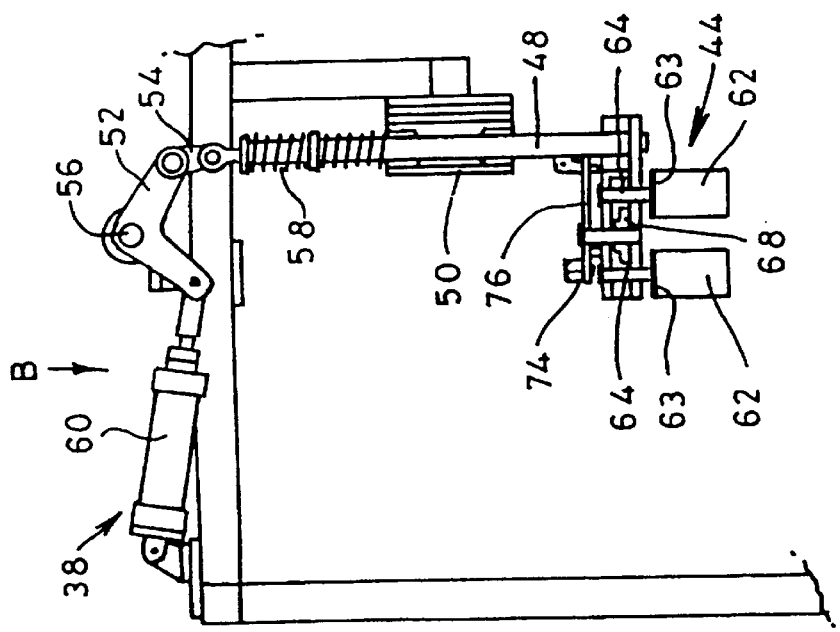
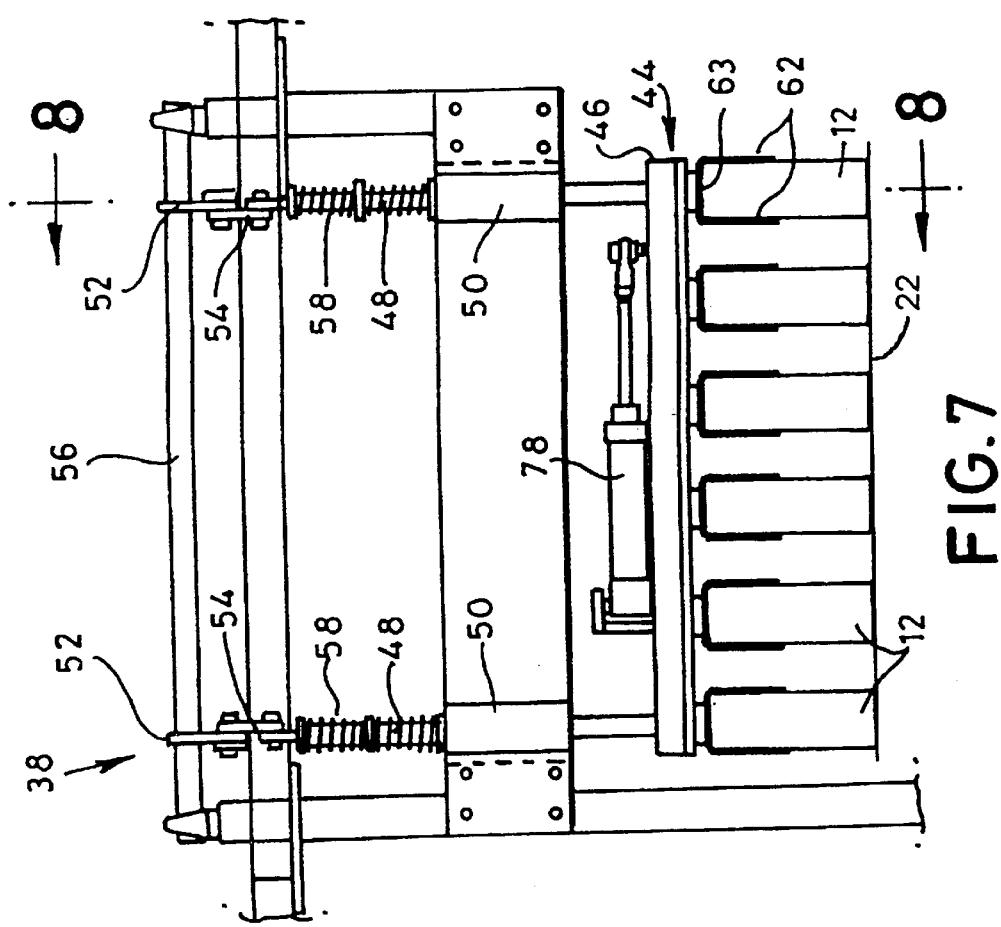

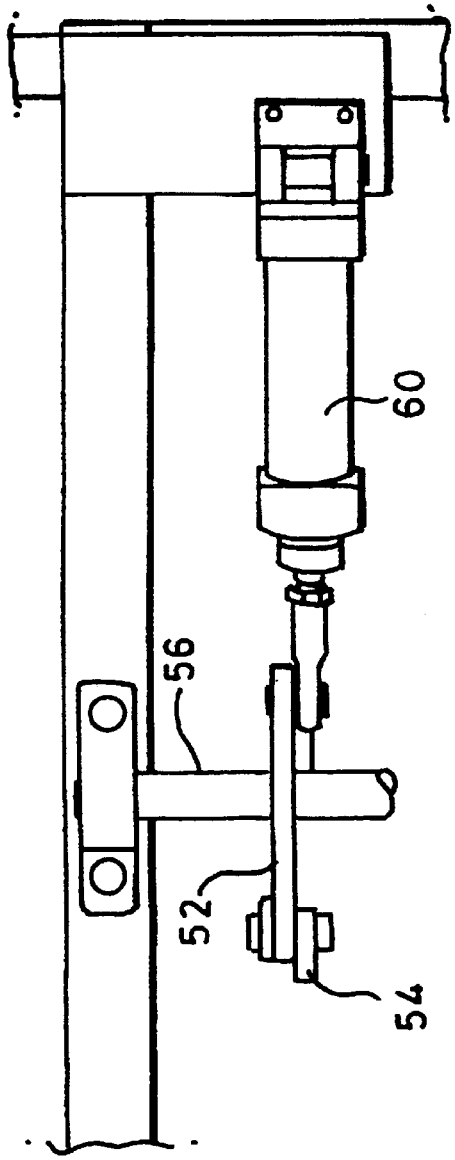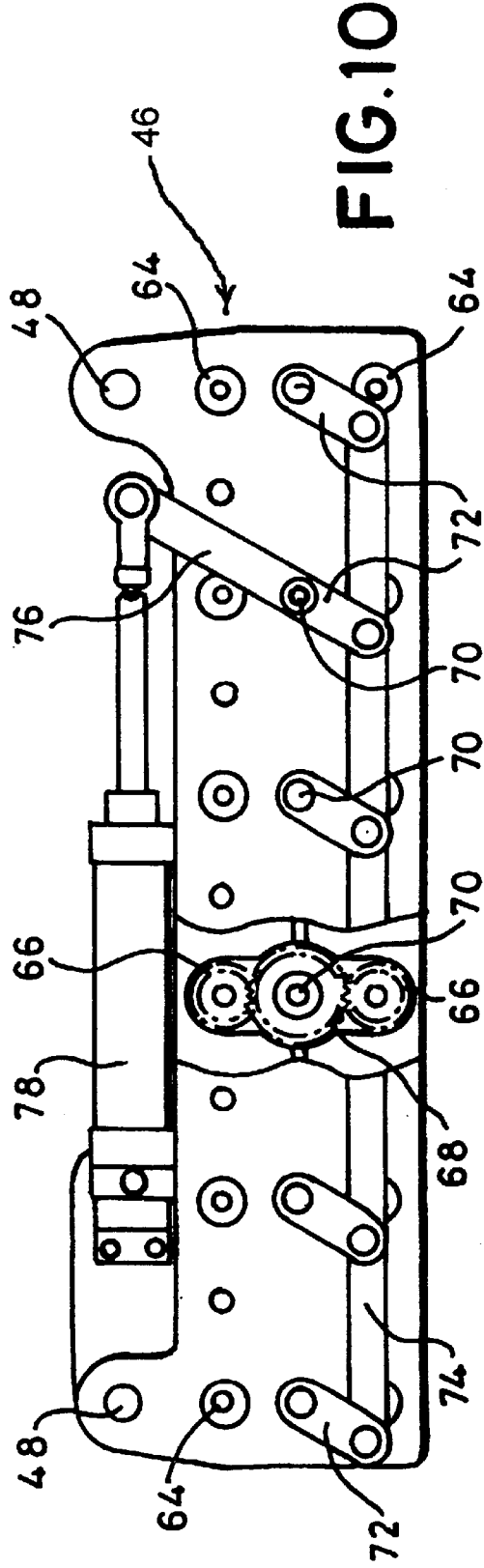

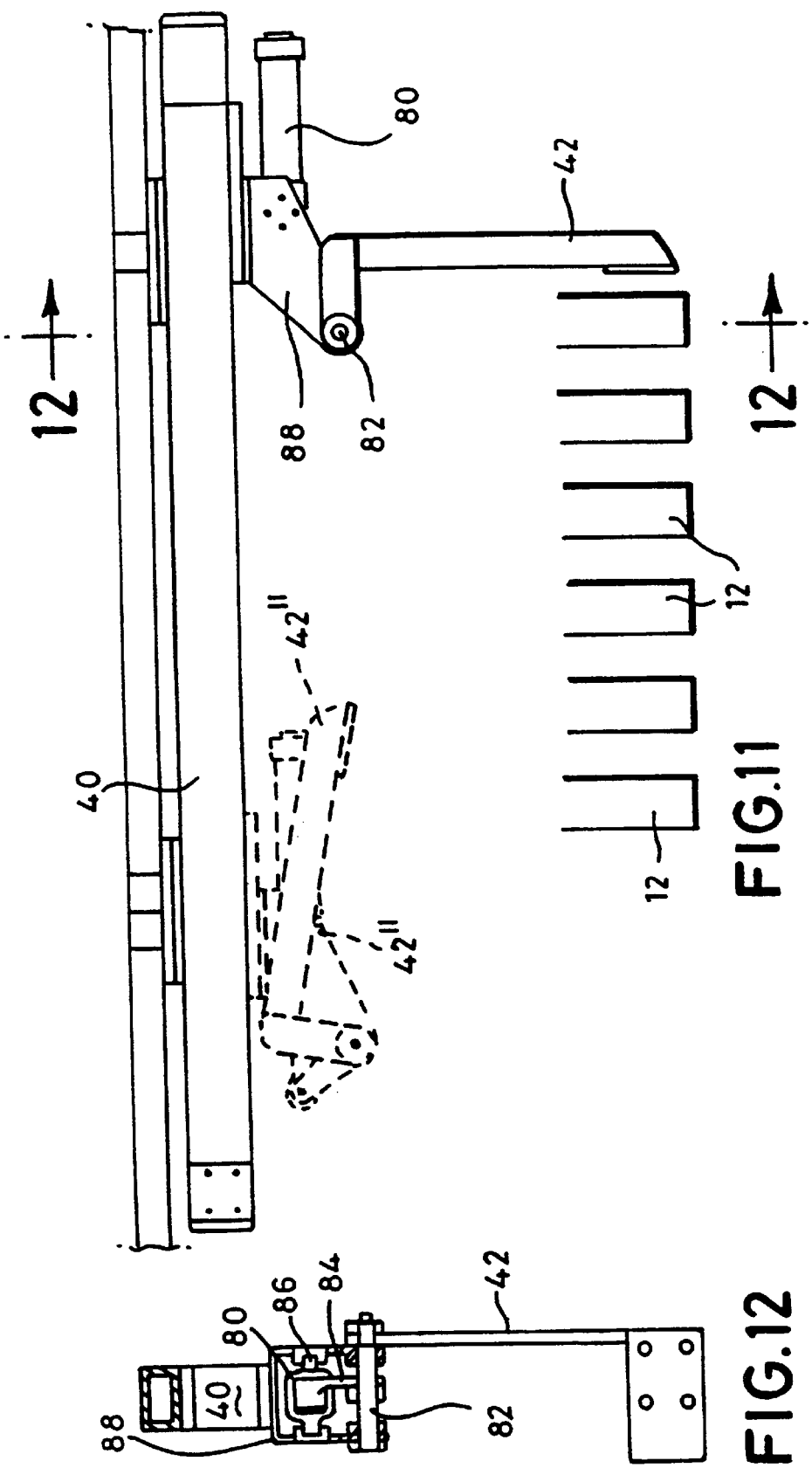

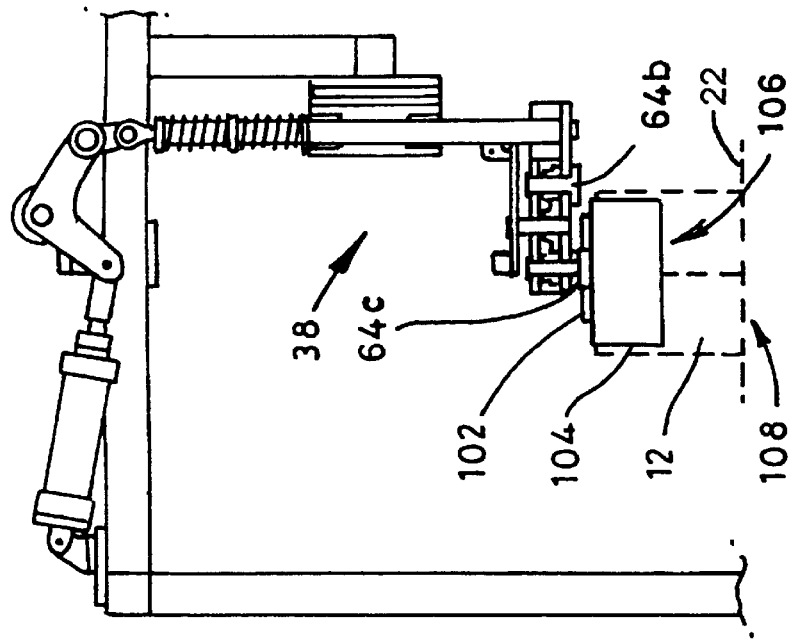
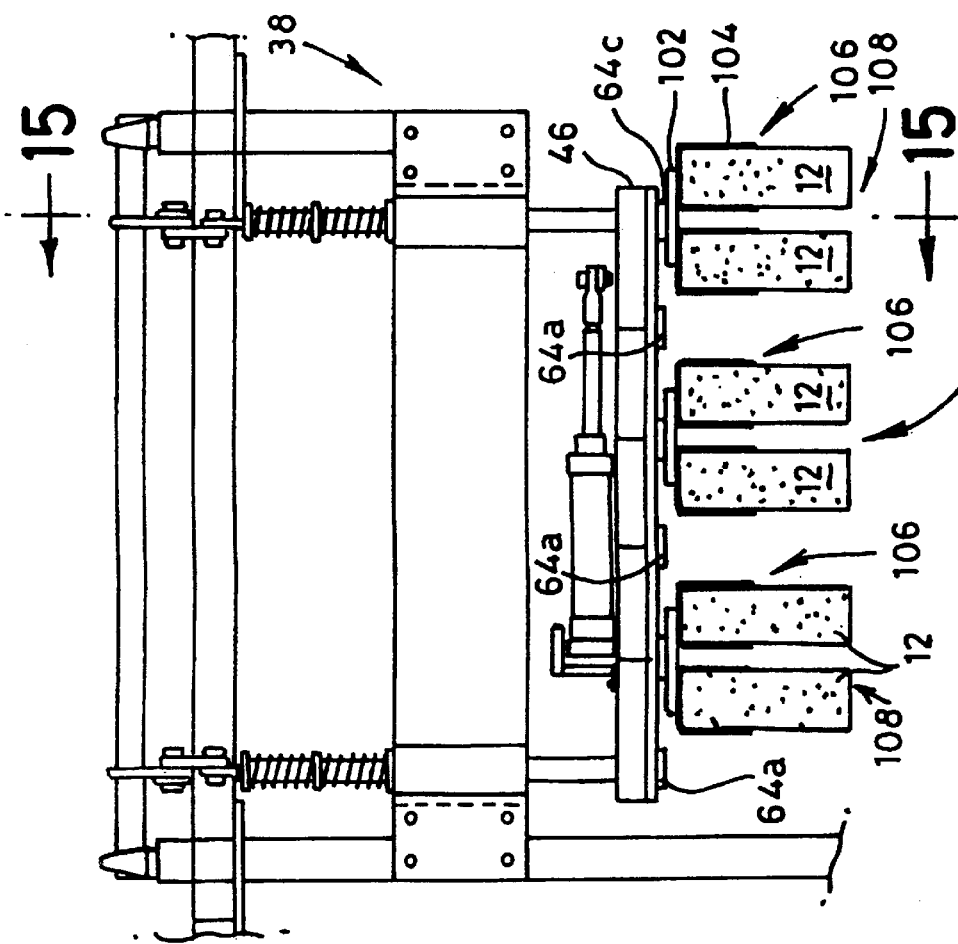

PACKAGING MACHINE INFEED DEVICE

This invention relates to a device for supplying groups of articles to a packaging machine. The articles concerned are of the kind that must be grouped together oriented in a particular direction, for example because they are rectangular in plan, perhaps with printed graphics that must be presented in a display case in a particular orientation. Typical of such articles are aseptic primary packs for milk or fruit juice, although many other articles present the same problems. The retail trade is becoming ever more insistent upon receiving product in a variety of primary pack designs, each intended to be supplied to the customer in a particular orientation within secondary packaging.

Often, an end-of-line packaging machine will be capable of receiving article groups in one orientation only. The whole production line will therefore be dedicated to that style of article alone. Where it is possible to adjust the packaging machine to accommodate different article styles and orientations, setting up for a new production run will usually be time-consuming. There is thus a need for packaging machinery capable of readily packaging groups of articles in a variety of different orientations and configurations.

U.S. Pat. No. 4,205,742 (Thomas) concerns a system for stacking building blocks or bricks wherein the blocks are carried by an infeed conveyor in abutting rows and columns. At the end of the infeed conveyor a group of blocks again consisting of abutted rows and columns is separated from the remainder on the infeed conveyor and transferred to three abutting re-orientation tables rotatable about vertical axes. The outer tables are also shiftable laterally to provide clearance for such rotation. The mechanical drive arrangements for transferring the blocks to and from the tables and for laterally shifting and rotating the tables, are relatively complex. Moreover the apparatus is not readily adaptable to suit different block sizes and desired packing configurations.

DE-A-2427818 discloses a case emptying machine having features as specified in the preamble of claim 1. Specifically the infeed conveyor comprises several divergent conveyors each carrying a lane of articles. The group collator comprises a further conveyor running transversely of the discharge ends of the infeed conveyors, and which also serves as means for transferring article groups out of the machine. The re-orienting means comprise turning fingers positioned above the further conveyor.

The present invention provides an infeed device for a packaging machine comprising:

an infeed conveyor carrying articles in a plurality of lanes to a group collator with the articles in a predetermined orientation;

wherein the group collator in use aligns a group of articles in one or more rows transverse to the infeed conveyor's direction of travel;

means for transferring the article group to the packaging machine;

re-orientating means being provided to turn sub-groups of articles in the group to a specified orientation for such transfer, each article sub-group being turned about a respective axis normal to the plane of the infeed conveyor, and at least one adjacent pair of the lanes of articles being spaced from one another on the infeed conveyor to allow turning of the sub-groups, characterised in that the lanes are parallel and the article transfer means comprises a pusher arranged to push the group of articles transversely off the infeed conveyor and into the packaging machine.

Each article sub-group may contain only one article, only one row of articles, or multiple rows and columns of articles, for example 2×2 articles. Preferably the articles in the group are arranged in two rows and six columns, each sub-group containing 2×2 articles. Alternatively the same article group may be divided into two sub-groups side-by-side, each containing 2×3 articles. The number of rows and columns in the group can be varied as desired, e.g. 1×6, divided into three sub-groups of 1×2 articles each, or 3×6, divided into two sub-groups of 3×3 articles each.

The re-orienting means may be selectively operable to turn the articles through 90° or allow them to pass from the transfer means in their original orientation. It may comprise turning heads engageable with the articles in each subgroup and rotatable about vertical axes to re-orientate the article subgroups. The turning heads may depend from a vertically reciprocable frame, whereby they may be moved selectively between operative and inoperative positions.

Each article sub-group is preferably engaged by an appropriately configured turning head attached to selected shafts of a gearbox forming part of the frame. Others of the gearbox shafts may remain redundant, the selected and redundant shafts varying depending on the group and sub-group configurations in use. Alternatively all the gearbox shafts may be used where necessary.

The group collator may space the group from the remaining articles and may comprise a backstop to arrest the movement of articles on the infeed conveyor and align them in the transverse rows, and a respective lane brake for engaging an article in each lane a predetermined number of articles away from the backstop, the backstop being movable in the infeed conveying direction to space the article group from the braked articles.

The backstop may be used to consolidate the group of articles into a compact array in the infeed conveying direction following re-orientation, and the transfer means may similarly be used to consolidate the group in the transverse direction, whether or not re-orientation has occurred.

These and other preferred features of the invention will be further understood from the following description of an illustrative embodiment made with reference to the drawings in which:

FIG. 1 shows various pack styles that may all be readily produced using the infeed device of the present invention in conjunction with a standard wrap-around packaging machine;

FIG. 5 is a sectional view taken on line 5—5 in FIG. 3;

FIG. 6 is a view corresponding to FIG. 5, but with the transfer and re-orientating means in alternative positions;

FIG. 7 is an elevational view showing the re-orientating means on an enlarged scale, the transfer means being omitted for clarity;

FIG. 8 is a sectional view taken on line 8—8 in FIG. 7;

FIG. 9 is a scrap view on arrow B in FIG. 8;

FIG. 10 is a plan view of a gearbox of the re-orientating means, shown partially broken away;

FIG. 11 is an elevational view showing the transfer means on an enlarged scale;

FIG. 12 is a sectional view on line 12—12 in FIG. 11;

Figure 13A:
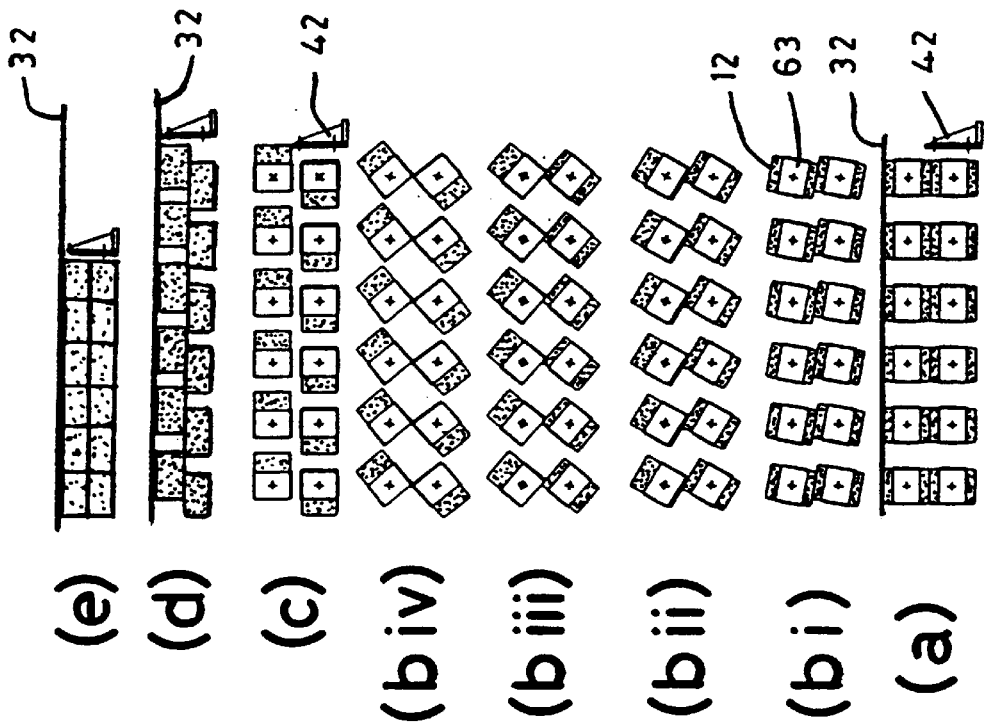
Figure 13B:
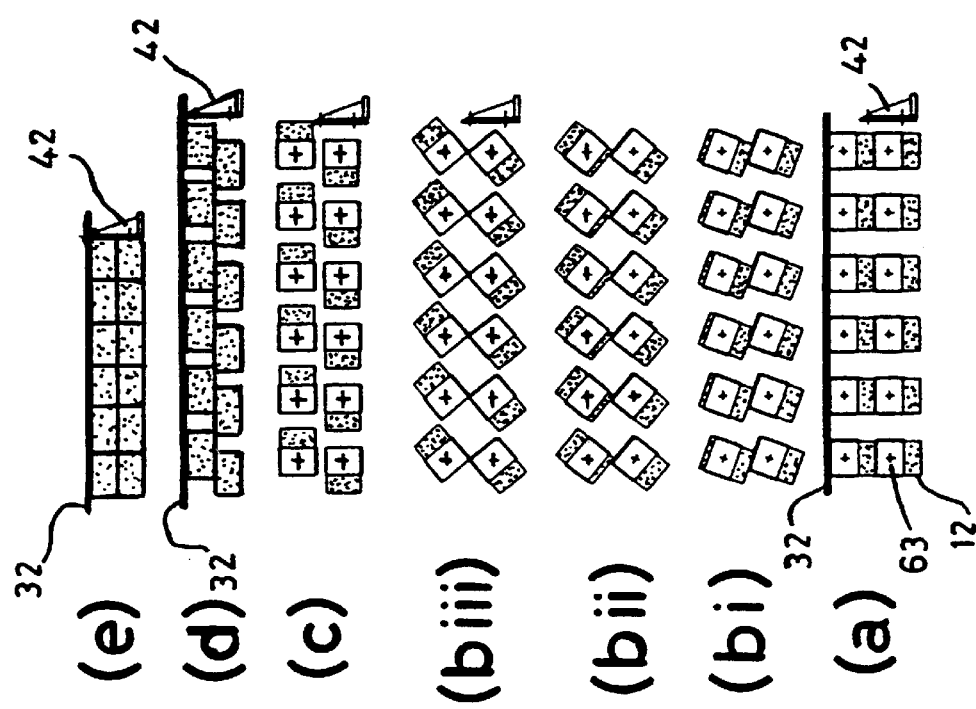
Figure 16:
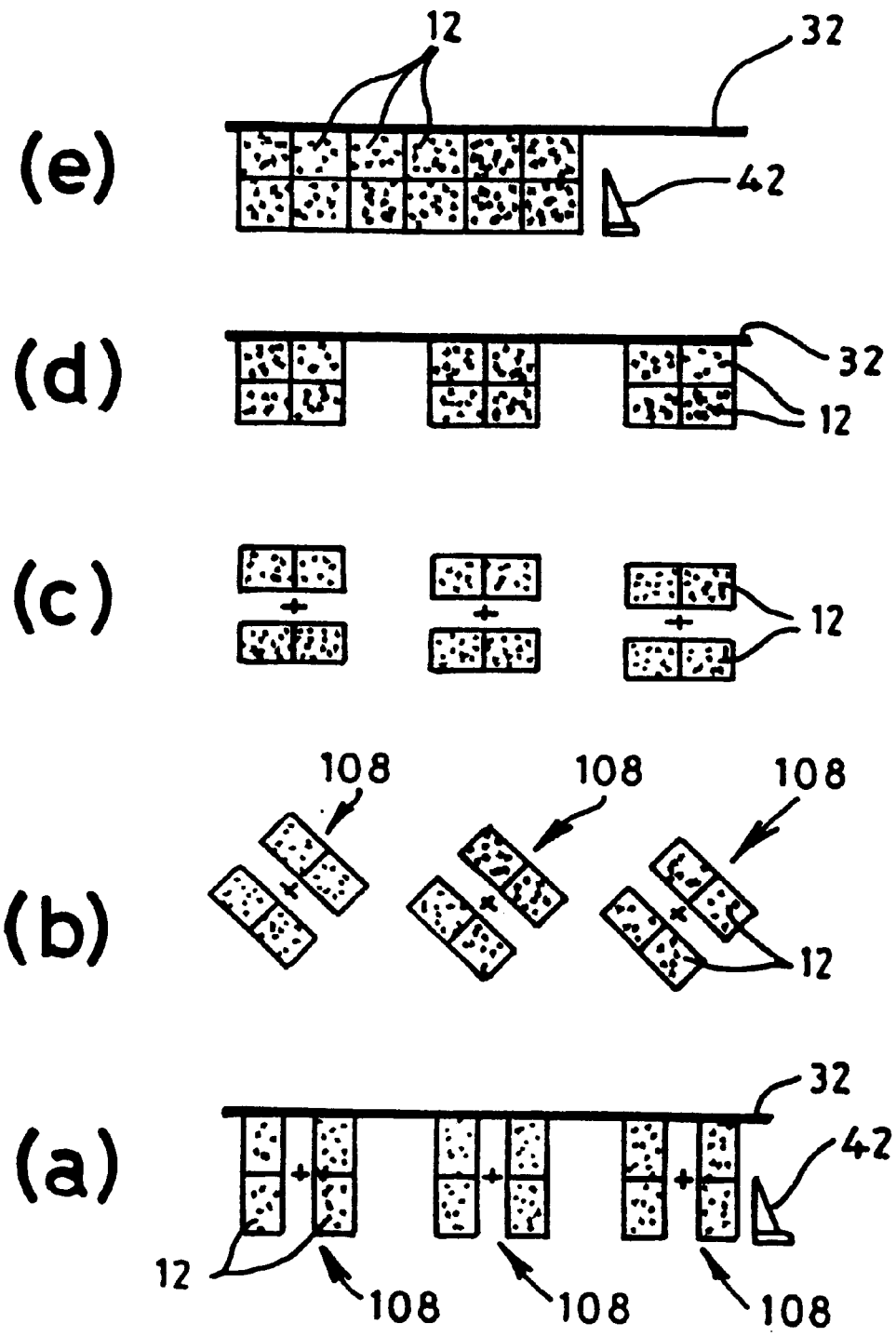

FIGS. 13a and 13b schematically show sequences of steps in the re-orientation of an array of articles using the device of the preceding figures;

FIG. 14 is an elevational view of modified re-orientating means, corresponding to FIG. 7 but configured for subgroups of 2×2 articles;

FIG. 15 is a sectional view taken on line 15—15 of FIG. 14, corresponding to FIG. 8; and FIG. 16 schematically shows a sequence of steps in the reorientation of a group of articles using the device of FIGS. 14 and 15.

FIG. 1 schematically shows various pack designs containing groups of primary packages indicated in dotted lines. The pack contents may have two different orientations: either with their long sides aligned with the longitudinal axis of the pack (as shown on the left of the figure) or with their long sides transverse to the pack axis (as in the remaining packs illustrated). The present device allows standard packaging machines such as the applicant's 'System 1200' range to produce both orientations, and readily switch between one orientation and the other.

Figure 2:
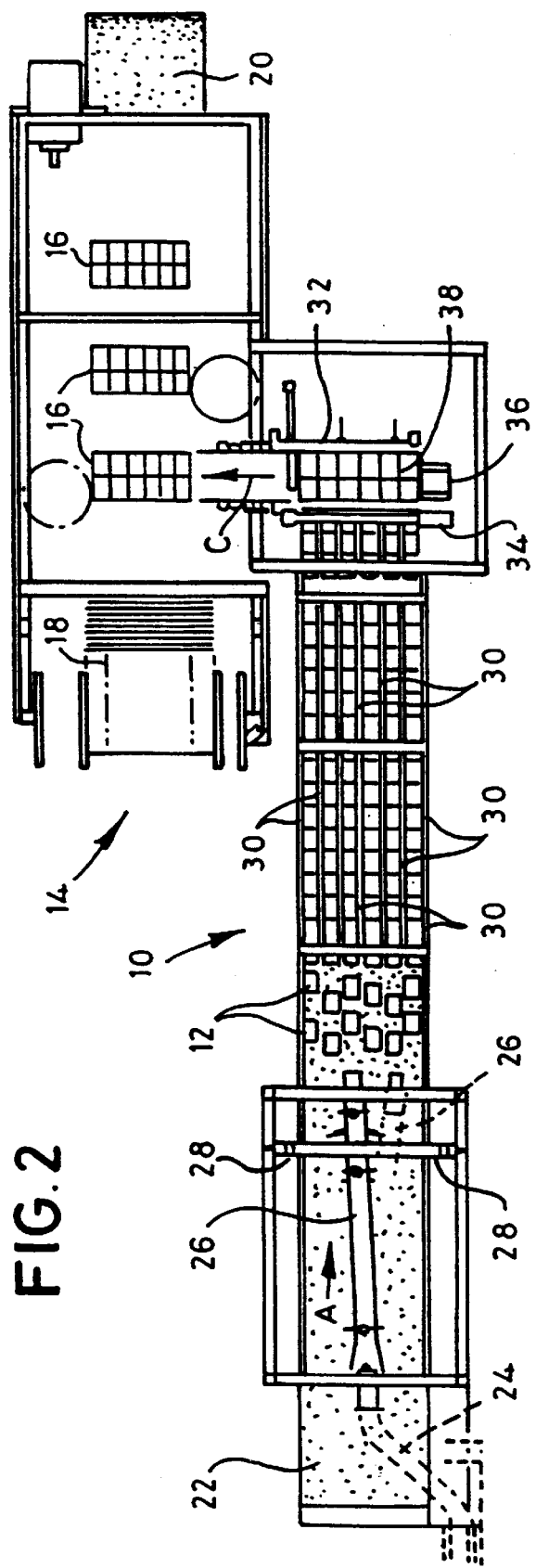
FIG. 2 is a plan view of the general layout of a packaging machine and an infeed device embodying the present inventions configured for article subgroups containing only one article.
Figure 3:
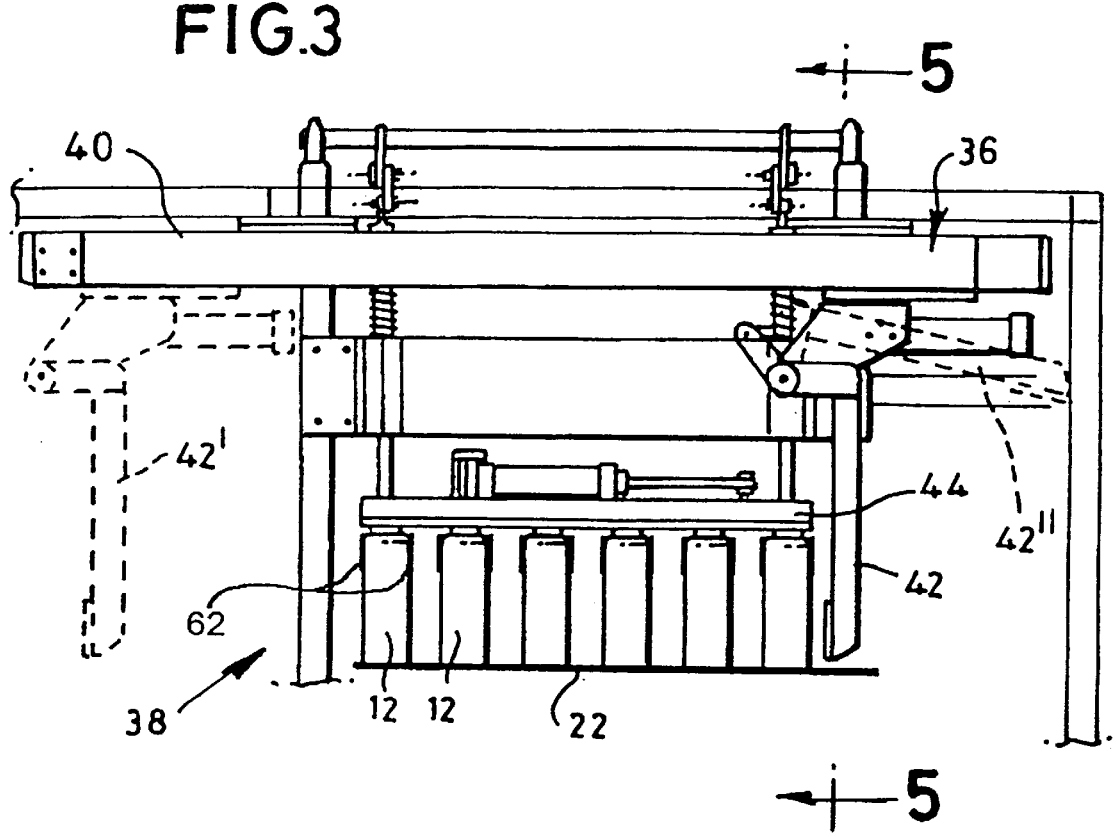
FIG. 3 is an elevational view of the re-orientating and transfer means of the device of FIG. 1.
Figure 4:
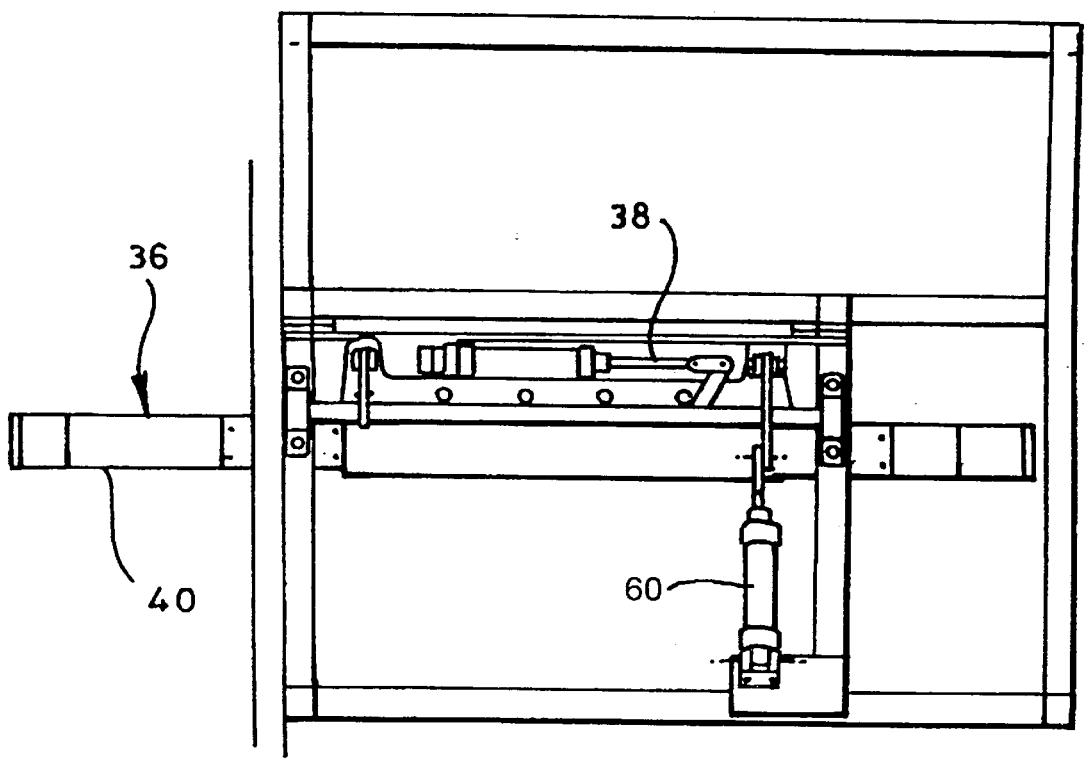
FIG. 4 is a plan view of the re-orientating means of FIG. 3.

The infeed device 10 of FIG. 2 is arranged to feed articles 12 to a packaging machine 14, the articles being arranged in groups 16 for the application of packaging material 18. The packaged groups leave the machine 14 by a discharge conveyor 20. Device 10 comprises a flat belt conveyor 22, moved continuously in the direction of arrow A. The articles 12 are supplied with their short sides leading, from a production line 24 down a chute 26 reciprocated across the width of the conveyor 22 by opposed actuators 28. The articles are marshalled into six parallel lanes by guides 30 adjustably mounted above the surface of conveyor 22 and are allowed to accumulate in queues against a backstop 32. A set of lane brakes 34 at the forward end of the guides 30 can be used to hold stationary the third article from the front of each queue. The backstop 32 can be moved forward in the direction of arrow A to separate the first two rows of articles from the remainder held by the lane brakes. Transfer means 36 and re-orientating means 38 can then be used to load the separated group of 2×6 articles into the machine 20. The backstop 32 can then be returned to its rearward position and the lane brakes 34 released, allowing the articles forward to form the next group.

The transfer means 36 and re-orientating means 38 are further illustrated in FIGS. 3–6. A rodless actuator 40 extends across the conveyor 22 above the articles 12 and carries a paddle 42 movable from the position shown in solid lines to the dotted line position 42' to push the group of articles 22 in the direction of arrow C, FIG. 2, into the packaging machine 14. The paddle can be raised to a position 42" during its return stroke, to allow the next group of articles 22 to move forward simultaneously.

The re-orientating means includes an article engaging frame 44 that can be lowered to the position shown in full lines in FIGS. 5 and 6 to engage and turn the group of articles, or raised to a position 44' shown in dotted lines, where articles 12 are free to pass underneath unaffected.

Referring to FIGS. 7–10, the article re-orientating means 38 is shown in still further detail. The frame 44 comprises a gearbox 46 supported on a pair of rods 48 reciprocable vertically through bearing blocks 50 by links 54 and bell cranks 52 keyed to a cross-shaft 56. The rods 48 are biased upwardly against the bearing blocks 50 by springs 58. An actuator 60 rotates the bell cranks 52 against the spring bias to move the frame downwardly for re-orientation of articles.

Depending from the gearbox 46 are twelve turning heads comprising pairs of fingers 62, one pair per article in the group. The fingers are rotatable 90° about shafts 64 from a position 62', FIG. 5, in which the articles from an aligned lane of the conveyor 22 can be received between each pair, to a position 62", FIG. 6, in which the long sides of the articles are turned to lie transversely of the conveyor 22. The fingers 62 are carried on the shafts 64 by bridging pieces 63.

The gearbox and its actuating mechanism are shown in more detail in FIG. 10. The shafts 64 carry pinion gears 66 at their upper ends, engageable with drive gears 68 keyed to shafts 70. Also keyed to shafts 70 are cranks 72 linked by a connecting rod 74. One of the cranks has an extension lever 76 on the opposite side of its shaft 70, acted on by an actuator 78 to turn all twelve shafts 64 together in the same direction.

FIGS. 11 and 12 show the transfer means. The paddle 42 is raised from the position shown in solid lines to its dotted line position 42" for the return stroke by an actuator 80. The paddle 42 is keyed to a shaft 82 to which a crank 84 is also keyed, having its other end pivotally connected to the rod of an actuator 80. Trunnions 86 mount the actuator 80 in a carriage 88 moved by the rodless actuator 40.

If it is desired to load the articles 12 into the machine 14 with their long sides leading in the direction of arrow C, FIG. 2, as shown, then the re-orientating means 38 remains in its inoperative, raised position. If however it is desired to produce packs as shown on the left hand side of FIG. 1, requiring the articles to be loaded in the direction of arrow C with their short sides leading, then the re-orientating means 38 is lowered so that articles exiting the conveyor guides 30 are received between the pairs of fingers in their positions 62' illustrated in FIG. 5, FIGS. 7 and 8 also showing the fingers 62 in this position. Actuator 78 can then be used to turn the articles through 90°.

A sequence of steps in the turning of an article group and its consolidation for loading into the machine 14 by the transfer means 36 is schematically illustrated in plan view in FIG. 13a. In step (a) the articles 12 have been received from the guides 30 to lie between the fingers 62 beneath the bridging pieces 63. As shown, the backstop 32 has been moved forward in the direction of arrow A, FIG. 2 to separate the group of articles from those held by the lane brakes 34 and align the leading edges of each article row with the leading edges of the corresponding row of fingers 62. In step ($b_i$) the backstop (not shown) has been moved slightly further in the direction of arrow A to provide clearance for turning the articles. As it turns, the rearward row of articles does not slide relative to the fingers and bridging pieces 63. However, the rear faces of the forward row of articles are engaged by the left-hand fingers of the rearward row and are pushed forwardly between the forward fingers as shown in step ($b_{ii}$), until the left-hand rearward fingers and right-hand forward fingers clear each other, as shown in step ($b_{iii}$). At this stage the rearward faces of the forward articles are approximately aligned with the rearward edges of the forward fingers. In step (c), the fingers have completed their 90° turn, with no further relative movement between them and the articles. In step (d) the re-orientating means 38 have been raised to release the articles 12 and backstop 32 has been moved in opposite direction to arrow A in FIG. 2, to consolidate the two rows of articles and align them with the paddle 42. In step (e) the paddle 42 is moved to the left (in the direction of arrow C, FIG. 2) to consolidate the article group in that direction and transfer it to the machine 14. The backstop 32 acts as a guide during this process.

FIG. 13b shows an alternative turning sequence. It is similar to that of FIG. 13a, except that backstop 32 is used initially to align each article row centrally of the corresponding fingers, considered in the direction of arrow A. In step ($b_i$) the forward row of articles begins to be pushed through its corresponding fingers by the rearward articles, until at step ($b_{ii}$) the forward faces of the rearward articles meet the right-hand forward fingers. These fingers then begin to push the rearward articles through the rearward fingers, until step ($b_{iv}$) is reached, corresponding to step ($b_{iii}$) of FIG. 13*a*. Steps (c)–(e) of FIG. 13*b* are identical to steps (c)–(e) of FIG. 13*a*. In step ($b_i$), FIG. 13*b*, it could equally well happen that any or all of the rearward articles begin to move relative to their fingers, instead of the forward articles. However by step ($b_{iv}$) the result will be the same.

If articles are to be loaded into the machine 14 without turning, the re-orientating means remains in its inoperative, raised position and if necessary the backstop is used to align the article group with the paddle 42 which is then moved in the direction of arrow c, FIG. 2, to consolidate the group and transfer it to the machine 14.

In the device configuration shown in FIGS. 14 and 15 the turning fingers 62 have been omitted from alternate front shafts 64*a*, and from all the rear shafts 64*b* of the gearbox 46. In place of turning fingers 62, the other front shafts 64*c* carry extension plates 102 to which pairs of inverted U-channel members 104 are fixed to form article turning heads 106. Each channel member 104 in use engages a column of two articles and thus each turning head engages a sub-group 108 of 2×2 articles. Do that adjacent sub-groups 108 do not interfere with each other as they turn, the spacing between the articles 12 of adjacent sub-groups is greater than the spacing of the channel members 104 in each turning head 106, to give the necessary clearances between turning heads. The lane guides 30 of the infeed conveyor are appropriately spaced to supply the articles 12 to the channel members 104 and the lane brakes 34 are likewise appropriately spaced to operate on each queue of articles 12.

FIG. 16 shows the turning sequence. In step (a) the articles 12 have been received from the guides 30 to lie between the channel members 104. As shown, the backstop 32 has been moved forwards in the direction of arrow A in FIG. 2 to separate the group of articles from those held by the lane brakes 34 and centralise the two rows of articles in the channel members 104. In step (b) the turning heads have begun to turn each article sub-group 108. In step (c) the turning heads 106 have completed their 90° turn. In step (d) the re-orientating means 38 have been raised to release the articles 12 from the channel members 104 and backstop 32 has been moved in opposite direction to arrow A in FIG. 2, to consolidate the two rows of articles and align them with the paddle 42. In step (e) the paddle 42 is moved to the left to consolidate the article group and transfer it to the machine 14, backstop 32 acting as a guide during this process.

Different turning head constructions to suit different article subgroup sizes and geometries will be readily apparent.

I claim:

1. An infeed device for a packaging machine comprising:
   an infeed conveyor carrying articles in a predetermined orientation in a plurality of parallel lanes;
   a group collator arranged to receive said articles from said lanes and which in use aligns a group of articles in one or more rows transverse to the infeed conveyor's direction of travel;
   means for transferring the article group to the packaging machine;
   re-orientating means being provided to turn sub-groups of articles in the group to a specified orientation for such transfer, each article sub-group being turned about a respective axis normal to the plane of the infeed conveyor, and at least one adjacent pair of the plurality of lanes of articles being spaced from one another on the infeed conveyor to allow turning of the sub-groups, the article transfer means comprising a pusher arranged to push the group of articles transversely off the infeed conveyor and into the packaging machine.

2. A device as claimed in claim 1, wherein each sub-group consists of one article.

3. A device as claimed in claim 1, wherein each sub-group consists of 2×2 articles.

4. A device as claimed in claim 1, wherein the re-orientating means is selectively operable to turn the articles through 90° or allow them to pass from the transfer means in their original orientation.

5. A device as claimed in claim 1, wherein the transfer means is used to consolidate the article group in the transverse direction.

6. A device as claimed in claim 1, wherein the re-orientating means comprises turning heads engageable with the articles in each sub-group and rotatable about vertical axes to re-orientate the article sub-groups.

7. A device as claimed in claim 6, wherein the turning heads depend from a vertically reciprocable frame, whereby they may be moved selectively between operative and inoperative positions.

8. A device as claimed in claim 1, wherein the group collator spaces the group from the remaining articles.

9. A device as claimed in claim 8 wherein the group collator comprises a backstop to arrest the movement of articles on the infeed conveyor and align them in the transverse rows, and a respective lane brake for engaging an article in each lane a predetermined number of articles away from the backstop, the backstop being movable in the infeed conveying direction to space the article group from the braked articles.

10. A device as claimed in claim 9 wherein the backstop is used to consolidate the group of articles into a compact array in the infeed conveying direction following re-orientation.

\* \* \* \* \*